United States Patent Office.

IMPROVED COMPOUND FOR THE CURE OF DISEASES IN HOGS.

DENNIS W. STOW, OF THORNTOWN, INDIANA.

Letters Patent No. 60,591, dated December 18, 1866.

The Schedule referred to in these Letters Patent and making part of the same.

TO ALL WHOM IT MAY CONCERN:

Be it known that I, DENNIS W. STOW, of Thorntown, in the county of Boone, and State of Indiana, have invented a new and useful mode of Curing Diseases in Hogs; and I do hereby declare that the following is a full and exact description thereof.

My invention relates to preventing and curing the diseases known as cough, cholera, fits, blind staggers, run-round, and thumps, in hogs, and consists in extracting or removing certain diseased teeth, which are believed to be the cause of the diseases named, and in connection therewith administering to the hog a medical compound to allay the fever and thirst which accompany the disease.

To enable others skilled in the art to make and use my invention, I will proceed to describe it.

When the hog is discovered to be affected with the diseases, cough, cholera, fits, blind staggers, run-round, or thump, an examination will reveal that one or more of those teeth, known as cuspids, superior and inferior, are diseased. These teeth are eight in number, being the first two on each side of both the upper and lower jaw, or four in each, and next in the rear of the lateral incisors. They are the temporary or deciduous teeth, and in healthy hogs are generally shed at about the age of six months. If the hog is impregnated with the disease, the first symptom will generally be a cough, and on examination it will be found that the teeth named have turned a dark grayish color or black. In the first stages of the disease, the end or crown of the teeth turns a grayish color, which spreads or extends itself over the entire exposed portion of the tooth. It next turns a brownish or dark color, and finally black, and sometimes, in extreme cases, attacking the gum about the insertion of the tooth. The diseased teeth become brittle, crushing easily in the forceps, and frequently are so tender that they cannot be drawn, in which case they must be broken off close to the gum, and the remaining portion picked out. As these are the temporary or deciduous teeth, a part of them may have been shed or broken off. The disease is generally accompanied by more or less fever and thirst, and even after the diseased teeth are removed, the animal will drink immoderately, frequently lying down and dying by the water. When the animal is affected with any of the above named diseases, (which are believed to originate from, and to be different manifestations of the same cause,) the remedy is to remove all, or all that remains of the eight cuspids or teeth above described, and at the same time give to each hog, two or three times daily, according to the virulence of the disease, one tenth of the following compound, composed in the proportions of two and a half tablespoonfuls each of saltpetre and sulphur, added to one pint of soft soap, being the quantity requisite for one dose for ten hogs. This may be given them in their water or slop, and will act as a purgative and serve to allay the fever and thirst, and should be discontinued as soon as the fever abates, which may be known by their ceasing to drink immoderately. This remedy does not apply to hogs after they have shed their temporary teeth.

I claim the compound herein described, in combination with the operation described, as a remedy for the cholera, &c., in hogs, substantially as set forth.

DENNIS W. STOW.

Witnesses:
O. F. MAYHEW,
WM. H. WEEKS.